United States Patent [19]

von Allwörden

[11] Patent Number: 5,005,696
[45] Date of Patent: Apr. 9, 1991

[54] ROUND BALER

[75] Inventor: Wilhelm von Allwörden, Gailingen, Fed. Rep. of Germany

[73] Assignee: Greenland Gmph & Co.

[21] Appl. No.: 349,709

[22] Filed: May 10, 1989

[30] Foreign Application Priority Data

May 11, 1988 [DE] Fed. Rep. of Germany ....... 3816189

[51] Int. Cl.$^5$ ............................................. B65D 71/00
[52] U.S. Cl. ........................................ 206/83.5; 100/6
[58] Field of Search ...................... 56/12.7, 341; 100/6, 100/39, 94–98 R; 206/83.5, 417

[56] References Cited

U.S. PATENT DOCUMENTS

| 45,284 | 11/1864 | Waste et al. ......................... 206/83.5 |
| 68,282 | 8/1867 | Brown ................................. 206/83.5 |
| 112,140 | 2/1871 | Hadwin ............................... 206/83.5 |
| 123,824 | 2/1872 | Hadwin ............................... 206/83.5 |
| 340,769 | 4/1886 | Davenport .......................... 206/83.5 |
| 496,042 | 4/1893 | Dederick ............................ 206/83.5 |
| 780,392 | 1/1905 | Wanamaker et al. .............. 206/83.5 |
| 2,378,522 | 6/1945 | Weaver ................................. 100/6 |
| 3,221,640 | 12/1965 | D'Arrigo ............................... 100/6 |
| 4,024,804 | 5/1977 | Hanson . |
| 4,085,570 | 4/1978 | Joray et al. ........................... 56/12.7 |
| 4,285,190 | 8/1981 | Ermachkov et al. ................ 56/341 |
| 4,470,241 | 9/1984 | Parry et al. ............................ 100/6 |
| 4,570,789 | 2/1986 | Fritz et al. ......................... 206/83.5 |
| 4,677,807 | 7/1987 | Verhulst et al. . |
| 4,781,291 | 11/1988 | Vanginhoven ..................... 206/83.5 |

FOREIGN PATENT DOCUMENTS

| 126278 | 11/1984 | European Pat. Off. . |
| 0629345 | 4/1936 | Fed. Rep. of Germany .......... 100/6 |
| 2457636 | 12/1980 | France . |
| 2003716 | 3/1979 | United Kingdom . |

Primary Examiner—Jimmy G. Foster

[57] ABSTRACT

A round bale which is wound by an agricultural round baler and consists of stalk crops, at least the interior of the round bale consisting of stalk crops cut into small pieces in the longitudinal direction of the stalks and the round bale being provided with a cover which consists of baler twine wound crosswise around the bale and/or of a netting web wound therearound.

2 Claims, 1 Drawing Sheet

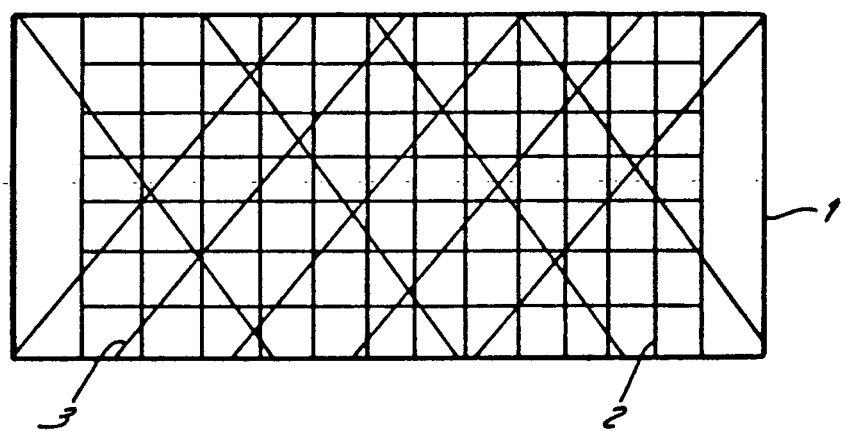

ROUND BALER

BACKGROUND OF THE INVENTION

1. Field of the Invention

The present invention relates to a round bale which is wound by an agricultural round baler and consists of stalk crops.

2. Description of the Related Art

Round bales of this kind are formed by round balers whererin a pick-up device picks up the mown stalk crops, feeds them via a feed drum into a feed channel and subsequently into the pressing chamber whose circumference has disposed thereon press rollers for forming a round bale which is thickly matted and whose individual stalks are interwoven. After a bale has been formed, it is bound by a suitable tying device and subsequently ejected by unhinging the rear half of the pressing chamber.

During the formation of the round bale the individual stalks are matted together to such an extent that difficulties may arise when the round bale is opened up later after the baler twines or the tying net have been removed. Although mechanical opening devices have already been developed, they cannot be used everywhere.

It is the object of the present invention to provide a round bale wound by an agricultural round baler and consisting of stalk crops, which defies all weather conditions, which maintain its shape in unchanged form even if it is transported several times, which can be stacked several times and easily opened up by hand after its cover has been removed.

SUMMARY OF THE INVENTION

According to a first embodiment the stalk crops are cut into short pieces in the longitudinal direction of the stalks and the round bale is provided with a cover of baler twine wound crosswise around the round bale in order to attain this object.

According to a second embodiment of the invention this object is attained by the measures that the stalk crops are cut into short pieces in the longitudinal direction of the stalks and that the round bale is provided with a cover consisting of a netting web.

According to a third embodiment of the invention this object is attained by the measures that the stalk crops are cut into short pieces in the longitudinal direction of the stalks and that the round bale is provided with a cover which consists of a netting web and of a baler twine wound crosswise around the round bale.

In another embodiment of the invention this object is attained by the measures that the interior of the round bale consists of stalk crops cut into small pieces in the longitudinal direction of the stalks, that at least the outermost surface layer is wound from uncut stalk crops, and that the round bale is provided with a cover which consists of baler twine wound crosswise and/or a netting web.

DESCRIPTION OF THE PREFERRED EMBODIMENTS

Such a round bale can be made with the help of a round baler as is described in the U.S. patent application Ser. No. 349,659 filed by the applicant on the same day as the present application, May 10, 1989. Hence, the round baler comprises a hinge-type pressing chamber with an inlet opening for the stalk crops and a tying arrangement for the completed bale, a pick-up device for the stalk crops, a feed drum which is diposed between the pick-up device and the inlet opening and whose length corresponds to the width of the bale to be formed, and a cutting device which is disposed in the feed channel and includes a plurality of pivotally supported knives which in their cutting position project into the feed channel and are arranged in at least one row, and which are held in their cutting position by means of spring-loaded knife levers and adapted to be pivoted against the spring load up to a position in which they have no cutting effect on the stalk crops. The winding device of this round baler ensures that after the round bale consisting of cut stalk crops has been formed, the baler twine is wound crosswise around the round bale in accordance with the first embodiment, the winding operation being for instance started at an end of the bale, the baler twine extending spirally along the surface of the bale to the other end thereof and then back to the starting position so that the baler twines cross each other.

In a second embodiment of the invention a netting web is provided instead of the baler twine, which is wound crosswise; the round bale which is completely wound and consists of stalk crops that have been cut into short pieces is here wrapped with the netting at least once before it is ejected.

According to the third embodiment of the invention, both a netting web and a baler twine that is wound crosswise may be placed around the completed wound round bale consisting of stalk crops cut into small pieces so as to increase the strength of the cover. This double cover ensures the great stability of the round bale which nevertheless can be very easily opened up by hand after said cover has been removed.

According to the fourth embodiment of the invention the interior of the round bale consists of stalk crops cut into small pieces in the longitudinal direction of the stalks, the exterior of the round bale being wound with at least one surface layer of uncut stalk crops, said layer having then placed thereon a cover which consists of baler twine wound crosswise and/or of a netting web.

In the last-mentioned embodiment the round baler is either provided with a sensor for sensing the internal pressure of the round bale or with a measuring device for measuring the diameter of the round bale; after a predetermined threshold value has been reached, said means ensure that the cutting device is completely swung out of the feed channel so that at least the last, i.e. the outermost surface layer is wound from uncut stalk crops. Such a round bale is especially resistant to deformations and weather exposure.

The enclosed drawing diagrammatically shows a round bale 1 whose interior consists of stalk crops cut into short pieces and whose exterior consists of at least one surface layer of uncut stalk crops. The round bale is provided with a cover which consists of a netting web 2 and a baler twine 3 wound crosswise.

I claim:

1. A round bale comprised of stalk crops cut into short pieces in the longitudinal direction of the stalks, a cover which consists of a netting web, and baler twine wound spirally around the surface of said round bale so that the baler twine crosses itself, said web being located between the stalk crops and baler twine.

2. A round bale comprising an interior of stalk crops cut into small pieces in the longitudinal direction of the stalks, an exterior of at least one surface layer of uncut stalk crops, a cover which consists of a netting web, and baler twine wound spirally around the surface of said round bale so that the baler twine crosses itself, said netting web being located between the exterior of uncut stalk crops and the baler twine.

* * * * *